Feb. 19, 1952      H. W. HAPMAN      2,586,537
CONVEYER SEALING DEVICE
Filed June 17, 1948
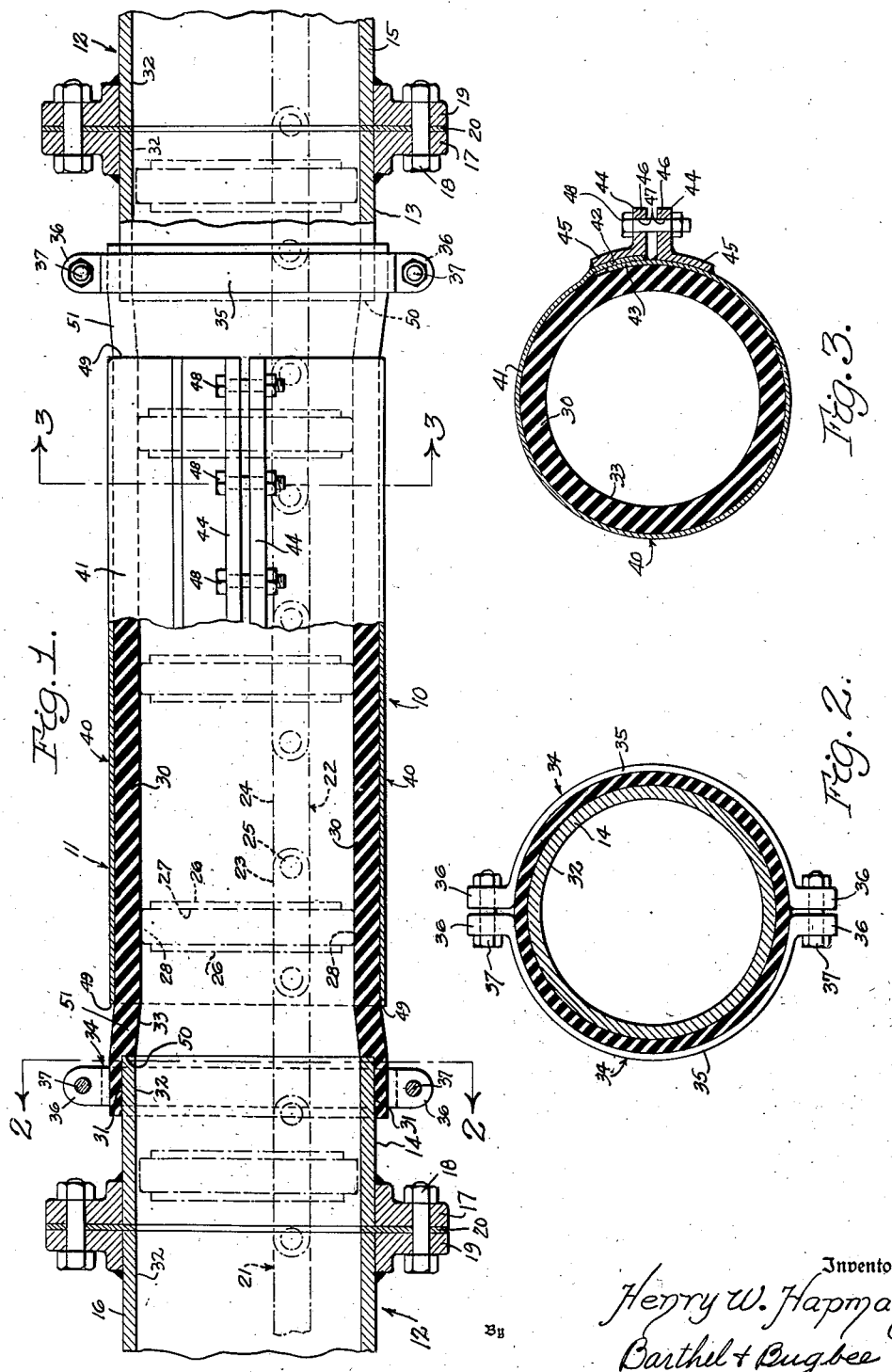

Patented Feb. 19, 1952

2,586,537

UNITED STATES PATENT OFFICE 2,586,537

CONVEYER SEALING DEVICE

Henry W. Hapman, Detroit, Mich., assignor, by mesne assignments, of sixty per cent to Henry W. Hapman and forty per cent to Hannah J. Hapman, both of Detroit, Mich.

Application June 17, 1948, Serial No. 33,629

1 Claim. (Cl. 198—168)

This invention relates to flight conveyors and, in particular, to sealing devices for sealing certain portions of the conveyor conduits in order to prevent the leakage of fluid between the conveyor flights and the conduit wall, especially when the interior of the conduit is under pressure.

One object of this invention is to provide a pressure-sealing device for flight conveyors wherein the conduit is provided with a resilient tubular portion which can be mechanically constricted so as to cause the inner walls of the resilient portion to snugly engage the peripheries of the flights as they pass by, thereby preventing the escape of fluid or solid matter under pressure past the rims of the flights.

Another object is to provide a pressure sealing device for flight conveyors wherein the mechanical constricting mechanism is of simple yet effective construction, so that the entire device may be manufactured at low cost and quickly and easily installed or repaired.

Another object is to provide a pressure-sealing device for flight conveyors wherein a gap is provided between the relatively rigid portions of the conveyor conduit, and a tubular member of elastic deformable material such as rubber or synthetic rubber is connected between the ends of the gap so as to continue the conduit, a mechanical compressing device or constrictor being applied to the resilient tubular member to urge its inner wall into snug but yielding contact with the conveyor flights during their travel through the conduit.

In the drawings:

Figure 1 is a side elevation, partly in central longitudinal section, of a portion of a flight conveyor employing the pressure-sealing device according to a preferred form of the present invention;

Figure 2 is a cross-section along the line 2—2 in Figure 1, showing how the resilient tubular insert is clamped to the end of the relatively rigid conveyor conduit; and Figure 3 is a cross-section along the line 3—3 in Figure 1, showing the mechanical constrictor or mechanism for circumferentially compressing the resilient tubular insert against the conveyor flight peripheries.

The present invention is a further improvement upon and a simplification of the flight conveyor sailing devices shown in my co-pending applications Serial No. 735,401 filed March 18, 1947 and now Patent No. 2,564,599 granted August 14, 1951, Serial No. 15,368 filed March 17, 1948, and Serial No. 24,580 filed May 1, 1948, for Self-sealing Conveyor Construction, Pressure-sealed Conveyor System, and Flight Conveyor Sealing Device, respectively. The present invention provides a different manner of urging the conveyor conduit into sealing contact with the peripheries of the conveyor flights.

In general, the present invention consists of a resilient tubular member which is adapted to be inserted in a gap in a flight conveyor conduit at a location where the user wishes to seal the conduit against the escape of pressure. The resilient tubular member is of elastic deformable material, such as rubber or synthetic rubber and is clamped at its opposite ends to the adjacent ends of the relatively rigid conveyor conduit. A constrictor or encircling member extending around the resilient tubular member enables the latter to be compressed and thereby caused to snugly engage the peripheries of the disc flights of the flight conveyor so as to prevent the escape of pressure from the spaces between the flights, these spaces in effect forming chambers to which fluid under pressure may be admitted, such as when the conveyor is employed in steam pressure or air pressure systems. The conveyor flights themselves are preferably of elastic deformable material, such as rubber or synthetic rubber.

Referring to the drawings in detail, Figures 1 to 3 inclusive show a portion of a pressure-sealed flight conveyor, generally designated 10, having a flight conveyor sealing device, generally designated 11, according to a preferred form of the present invention, and inserted in a gap in the flight conveyor conduit, generally designated 12, and having opposite end connectors 13 and 14 secured to the free ends 15 and 16 of the conveyor conduit 12. The connectors 13 and 14 have flanges 17 bolted as at 18 to corresponding flanges 19 welded to the conduit ends 15 and 16, with a gasket 20 interposed therebetween to prevent leakage.

A conventional flight conveyor unit, generally designated 21, extends through the conduit 12 and sealing device 11 and, for purposes of illustration and not limitation, consists of an endless chain generally designated 22 having outer and inner links 23 and 24 interconnected by pivot pins or bolts 25. Secured to the outer links 23 are approximately semi-circular flight clamping plates 26 arranged side by side to form substantially circular discs with a diametrical gap between them. The clamping plates 26 are secured by any suitable fasteners, such as bolts (not shown) on opposite sides of the circular flight discs 27. The latter have peripheral edges 28 engageable with the inner walls of the conduit 12, and sealing device 11 and are preferably formed of rubber or synthetic rubber of the general class of materials known generically as elastic deformable material. The details of the flight conveyor 21 lie outside the present invention, and any suitable conveyor may be used, such as, for example, the one shown in my co-pending application Serial No. 676,546 filed June 13, 1946, for "Flight Conveyor." Actually, the clamping plates 26 have forwardly projecting ears which extend parallel with the outer links 23 of the chain 22 and are secured in assembly therewith by the pivot pins or bolts 25.

The flight conveyor sealing device 11 consists of a resilient tubular member 30 having counterbored or countersunk portions 31 at its opposite ends, these countersunk portions 31 being of substantially the same thickness as the wall thickness of the connectors 13 and 14 so that the bore 32 thereof is substantially flush with the inner wall 33 of the tubular member 30. The tubular member 30 is preferably of elastic deformable material, such as rubber or synthetic rubber, so as to be compressible against the conveyor flights 27. The opposite ends of the tubular member 30 are secured to the end connectors 13 and 14 by clamps 34. The clamps 34 are of any suitable type, those shown for purposes of illustration consisting of semi-circular bands 35 having radially extending lugs 36 (Figure 2) clamped together by clamping bolts 37.

In order to compress the tubular member 30 in the manner shown in Figure 1, the sealing device 11 is provided with a mechanical constrictor, generally designated 40. This constrictor 40 may obviously take several forms since its function is to encircle the resilient tubular member 30 and force the latter inward against the disc flights 27. For purposes of illustration, but not limitation, the constrictor 40 is shown as consisting of a band 41 of metal or other suitable flexible material (Figure 3), preferably sheet material, having overlapping edge portions 42 and 43 respectively. Secured as by welding to the overlapping edge portions 42 and 43 are the arcuate flange portions 44 of angle members 45 of approximately L-shaped cross-section, the projecting flanges 46 of which are provided with spaced holes 47 to receive clamping bolts 48. The ends 49 of the band 41 preferably terminate inwardly from the ends 50 of the end connectors 13 and 14, so as to provide a resilient portion 51 therebetween which is free from the constricting action of the constrictor 40 and from the clamping action of the clamping members 34.

In the operation of the invention, the flight conveyor 22 is trained through the conduit 12 in the usual way and caused to pass through the sealing device 40 before the clamping bolts 48 are tightened. When the ends of the conveyor have been trained around whatever sprocket (not shown) is used for driving purposes, the clamping bolts 48 are carefully tightened to bring the flanges 46 closer together and cause the band 41 to compress the tubular member 30 and cause its inner wall 33 to become of smaller diameter. This, in turn, causes the inner wall 33 to snugly engage the peripheral edges 28 of the flight discs 27 as tightly as is necessary, consistent with the amount of pressure to be sealed and the ease of motion desired for the conveyor 22. This constriction brought about by the constrictor 40, thereby decreasing the inner diameter of the tubular member 30, is shown in Figure 1 at the left-hand end of the constrictor 40, and is somewhat exaggerated for purposes of clearness of showing.

What I claim is:

A flight conveyor sealing device for insertion in a gap in a conduit traversed by a flight conveyor, said sealing device comprising a resilient tubular member having a bore therethrough for the passage of said flight conveyor, clamping members securing the opposite ends of said tubular member to the ends of said conduit at said gap, and a constrictor encircling said tubular member and having tightening elements connected thereto, said constrictor comprising a flexible band extending around said tubular member and having opposite overlapping free longitudinal edge portions extending lengthwise of said tubular member, said tightening elements being secured between spaced parts of said edge portions.

HENRY W. HAPMAN.

REFERENCES CITED

The following references are of record in the file of this patent:

UNITED STATES PATENTS

| Number | Name | Date |
| --- | --- | --- |
| 1,048,019 | Wilson | Dec. 24, 1912 |
| 1,242,060 | Smakal | Oct. 2, 1917 |
| 2,183,835 | Foulke | Dec. 19, 1939 |
| 2,357,651 | Hapman | Sept. 5, 1944 |